Dec. 13, 1966 R. M. BERLIND 3,292,100

PULSE GENERATOR WITH MULTIPLE PHASE-DISPLACED OUTPUTS

Original Filed Feb. 12, 1963 2 Sheets-Sheet 1

RICHARD M. BERLIND
INVENTOR.

BY Isidore Match

ATTORNEY

Dec. 13, 1966 R. M. BERLIND 3,292,100

PULSE GENERATOR WITH MULTIPLE PHASE-DISPLACED OUTPUTS

Original Filed Feb. 12, 1963 2 Sheets-Sheet 2

RICHARD M. BERLIND
*INVENTOR.*

BY Isidore Match

ATTORNEY

United States Patent Office 3,292,100
Patented Dec. 13, 1966

3,292,100
PULSE GENERATOR WITH MULTIPLE PHASE-DISPLACED OUTPUTS

Richard M. Berlind, Phoenix, Ariz., assignor to General Electric Company, a corporation of New York Continuation of application Ser. No. 257,917, Feb. 12, 1963. This application Jan. 4, 1966, Ser. No. 528,679
6 Claims. (Cl. 331—45)

Figures 1, 3, 4:
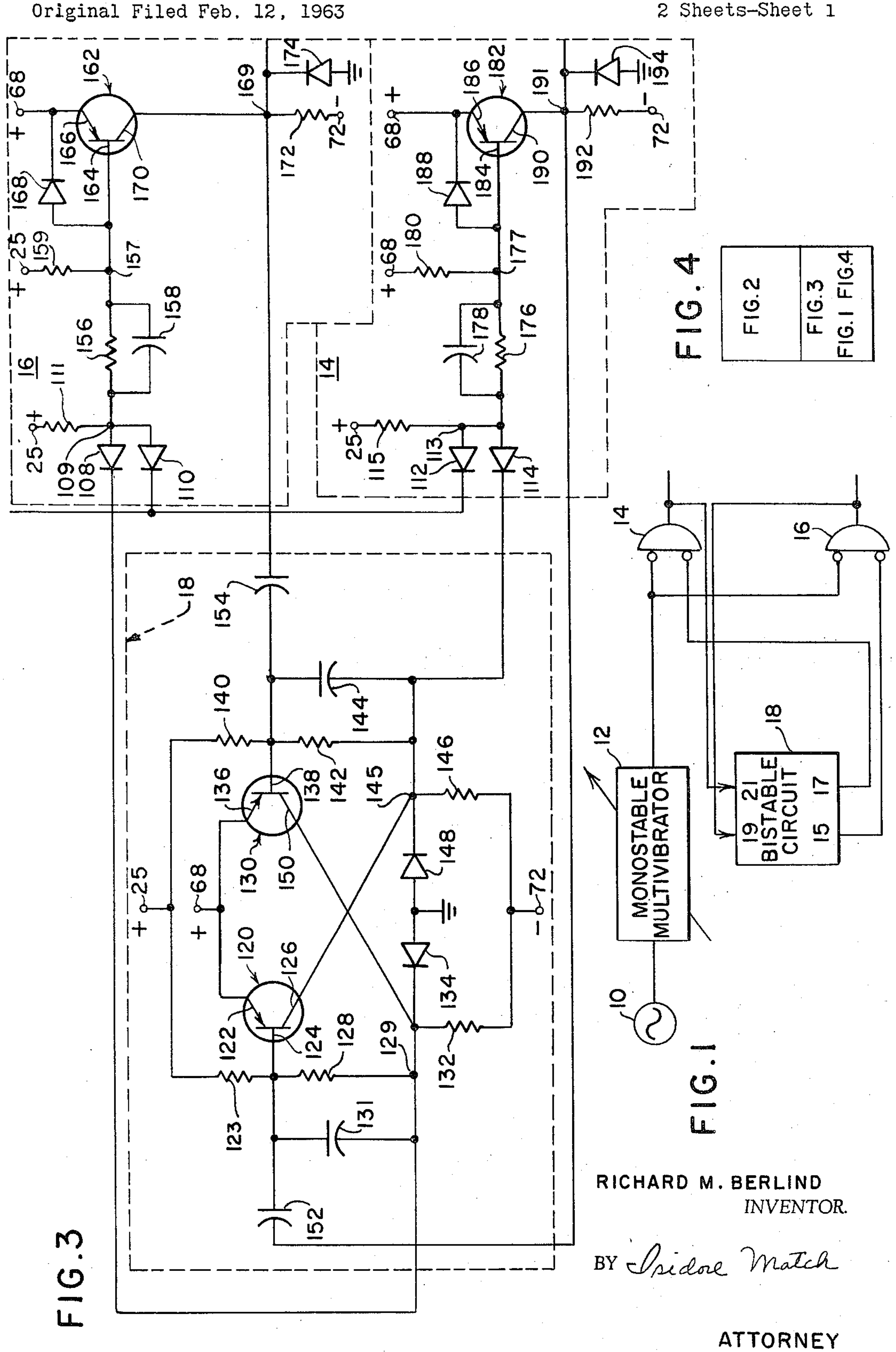

This application is a continuation of application, Serial No. 257,917, Richard M. Berlind, filed on February 12, 1963, entitled Pulse Generator With Multiple Outputs, assigned to the same assignee as the present invention and now abandoned.

This invention relates to oscillators. More particularly, it relates to a new and improved pulse generator.

It is an important object of this invention to provide a novel and improved pulse generator.

It is another object of this invention to provide a pulse generator in accordance with the preceding object which provides a pair of identical pulse trains 180° displaced in phase with respect to each other.

It is a further object of this invention to provide a pulse generator which provides a pair of pulse trains 180° out of phase with each other, the pulses of each pulse train having a width corresponding to the width of the input pulses to the pulse generator.

Generally speaking and in accordance with the invention, there is provided a sinusoidal oscillator having a given frequency, a variable monstable multivibrator, a bistable circuit such as a flip-flop and a pair of circuits each of which provide a gating function. The multivibrator is triggered by the output of the oscillator and the output of the multivibrator is applied as an input to each of the gating circuits. The respective outputs of the flip-flop comprise the other inputs to the gating circuits. The outputs of the gating circuits are applied as respective triggering inputs to the flip-flop. With this arrangement, at the outputs of the gating circuits, there are produced a pair of identical, variable width pulse trains 180° displaced in phase and having half of the aforesaid given frequency.

The novel features, which are believed to be characteristic of this invention, are set forth with particularity in the appended claims. The invention itself, however, both as to its organization and method of operation together with other and further objects thereof may best be understood when taken in connection with the accompanying drawings.

Figure 2:
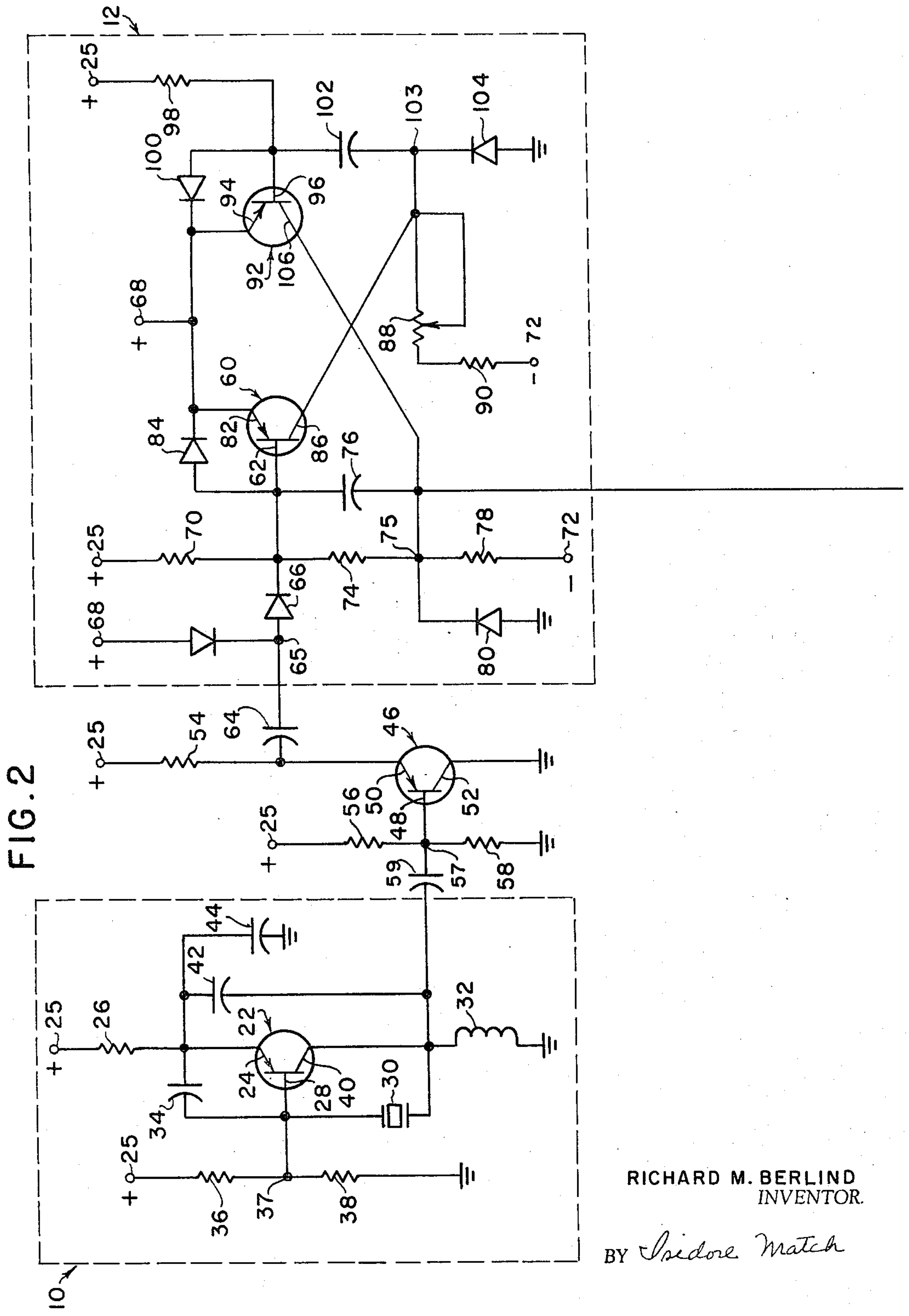

In the drawings:

FIG. 1 is a block diagram of an illustrative embodiment of a pulse generator constructed in accordance with the principles of the invention; and FIGS. 2 and 3 taken together as in FIG. 4 are schematic depictions of a circuit representative of the embodiment of FIG. 1.

Referring now to FIG. 1, a sinusoidal voltage oscillator 10 which preferably is of the crystal controled type and which has a suitable frequency, 400 kc., for example, has its output applied to a variable monostable multivibrator 12. The terminal at which the astable output of multivibrator 12 is produced is connected to one terminal respectively of stages 14 and 16 which provide NAND functions. Stages 14 and 16 may be conventional NAND gates which provide a negative output only when there is a coincidence of positive signals at all the inputs thereof.

A bistable circuit 18 such as a flip-flop provides a set and a reset output respectively at terminals 15 and 17 thereof, these outputs in accordance with the operation of flip-flops being complementary. Set output terminal 15 is connected as the other input to stage 16 and reset output terminal 17 is connected as the other input to stage 14. The output of stage 16 is applied to the set input terminal 19 of bistable circuit 18 and the output of stage 14 is applied to the reset input terminal 21 of bistable circuit 18. It will be obvious to those skilled in the art from the explanation of the circuit operation below that other types of gates may be substituted for gates 14 and 16, with appropriate changes being made in the interconnections between the gates and bistable circuit 18.

In considering the operation of the pulse generator of FIG. 1, monostable multivibrator 12 being triggered by the output of sinusoidal oscillator 10 produces a pulse train having the frequency of oscillator 10, the percentage duty cycle of this pulse train being determined by the RC time constant arrangement in the multivibrator. The astable output of multivibrator 12 is applied as an input to NAND stages 14 and 16, respectively. If it is assumed that stages 14 and 16 are NAND circuits of the type which produce a negative or zero volt output only upon the coincidence of positive signals of a given level appearing at all of their respective inputs, then the astable output of multivibrator 12 is taken in positive polarity at such given level. Consequently, in such situation, the inputs to stages 14 and 16 from reset output terminal 17 and set output terminal 15, respectively, of bistable circuit 18 also have to be positive to produce the negative or zero volt output from stages 14 and 16. The output of NAND stage 14 is utilized to switch bistable circuit 18 from its set to its reset state and the output of NAND stage 16 is utilized to switch bistable circuit 18 from its reset to its set state. Accordingly, with the arrangement of FIG. 1, there are produced at the outputs of NOR stages 14 and 16, two identical, variable width pulse trains, 180° displaced in phase with respect to each other, and having half the frequency of the output of sinusoidal oscillator 10.

In FIGS. 2–4 wherein there is schematically depicted a circuit representative of the embodiment shown in block form in FIG. 1, the crystal controlled sinusoidal oscillator comprises a transistor 22 having an emitter 24 connected to a positive potential source 25 through a resistor 26 and a base 28 connected to ground through the series arrangement of an oscillator frequency controlling crystal 30 and an inductor 32 and to emitter 24 through a capacitor 34. Base 28 is also connected to the junction 37 of resistors 36 and 38 which comprise a voltage divider connected between source 25 and ground. The collector 40 of transistor 22 is directly connected to inductor 32. A capacitor 42 is provided connected between emitter 24 and collector 40 and emitter 22 is also grounded through a capacitor 44. The values of the circuit components of oscillator 10 and the natural frequency of crystal 30 are chosen to produce a sinusoidal output therefrom of a given frequency, suitably 400 kc.

The output appearing at collector 40 is applied through a capacitor 59 to the base 48 of a transistor 46 connected as an emitter follower which provides current amplification of the output of oscillator 10. In the emitter follower stage, the emitter 50 is connected to positive source 25 through a resistor 54, the collector 52 is directly connected to ground and the base 48 is connected to the junction 57 of resistors 56 and 58 which comprise a voltage divider connected between source 25 and ground.

The output appearing at emitter 50 is applied to the base 62 of monostable multivibrator transistor 60 through the series arrangement of a coupling capacitor 64 and the anode to cathode path of a diode 66, diode 66 insuring that only positive half cycles are applied to base 62. The junction 65 of capacitor 64 and diode 66 is connected to a positive potential source 68 to negatively clamp the potential applied to base 62 to the value of source 68. Base 62 is also connected to source 25 through a resistor 70 and to a source of negative potential 72 through the series arrangement of the parallel combination of a resistor 74 and a capacitor 76, and a resistor 78, the junction 75 of resistors 74 and 78 being connected to ground through the cathode to anode path of a diode 80, diode 80 serving to negatively clamp junction 75 to ground potential. The emitter 82 is directly connected to potential source 68 and to base 62 through the cathode to anode path of a diode 84. The collector 86 is connected to negative source 72 through the series arrangement of a variable resistor 88 and a resistor 90.

In transistor 92, the other active element of monostable multivibrator 12, the emitter 94 is tied to emitter 82, the base 96 is connected to source 25 through a resistor 98, to emitter 94 through the anode to cathode path of a diode 100, and to ground through the series arrangement of a capacitor 102 and the cathode to anode path of a diode 104, diode 104 serving to negatively clamp the junction 103 of capacitor 102 and resistor 88 to ground potential. The collector 106 is connected to junction 75. The duty cycle, i.e., the pulse width of the astable output of multivibrator 12 may be varied by varying resistor 88. The astable output appears in the form of positive pulses at junction 75, the pulses having a repetition frequency equal to the frequency of the output of oscillator 10 and an amplitude slightly less than the voltage from source 68. The output appearing at junction 75 is applied to the cathode of a diode 110 and the cathode of a diode 112.

Diode 110 together with a similarly poled diode 108, the junction 109 of the anodes of these diodes being connected to potential source 25 through a resistor 111, comprise an AND stage. This AND stage is coupled with an inverting transistor 162, the combination corresponding to stage 16 in FIG. 1. Diode 112 together with a similarly poled diode 114, the junction 113 of the anodes of these diodes being connected to potential source 25 through a resistor 115, also comprise an AND stage. This AND stage is coupled with an inverting transistor 182, the combination corresponding to stage 14 in FIG. 1.

Bistable circuit 18 of FIG. 1 may suitably be a flip-flop which comprises transistors 120 and 130, as illustrated in FIGURE 3. In transistor 120, the emitter 122 is directly connected to source 68, the base 124 is connected to positive source 25 through a resistor 123 and to negative source 72 through the series arrangement of the parallel combination of a resistor 128 and a capacitor 131, and a resistor 132, the junction 129 of resistors 128 and 132 being grounded through the cathode to anode path of a diode 134, diode 134 serving to negatively clamp junction 129 to ground potential. In transistor 130, the emitter 136 is tied to emitter 122, the base 138 is connected to source 25 through a resistor 140 and to source 72 through the series arrangement of the parallel combination of a resistor 142 and a capacitor 144, and a resistor 146, the junction 145 of resistors 142 and 146 being grounded through the cathode to anode path of a diode 148, diode 148 serving to negatively clamp junction 145 to ground potential. The collector 126 is connected to junction 145 and the collector 150 is connected to junction 129. The outputs appearing at junctions 129 and 145 are like rectangular waves 180° displaced in phase with respect to each other, the pulses therein having a pedestal value substantially equal to the value of source 68 and a base value of ground. Flip-flop 18 is a known circuit and further description of its operation is deemed unnecessary. The output appearing at junction 129 is applied to the cathode of diode 108 and the output appearing at junction 145 is applied to the cathode of diode 114.

During succeeding cycles of the multivibrator 12 an output pulse is generated alternately at the junctions 169 and 191. The output pulse is generated at the junction 169 as follows. Assuming that the transistor 130 in the flip-flop 18 is conducting, the junction 129 is at a voltage level substantially equal to that of the source 68. The cathode of the diode 108 is also at this voltage level. When the transistor 92 in FIG. 2 is conducting, the junction 75 and thus the cathode of the diode 110 are also at a positive voltage level. The diodes 108 and 110 stop conducting so that a positive voltage appears at the junction 109. This voltage is passed through the filter parallel combination of a resistor 156 and a capacitor 158 to the base 164 of an inverter transistor 162. The junction 157 of resistor 156 and base 164 is connected to potential source 25 through a resistor 159.

In transistor 162, the emitter 166 is connected to source 68, base 164 is connected to emitter 166 through the anode to cathode path of a diode 168 and the collector 170 is connected to negative source 72 through a resistor 172, the junction 169 of collector 170 and resistor 172 being grounded through the cathode to anode path of a diode 174, diode 174 serving to negatively clamp junction 169 to ground potential. When a positive voltage appears at the junction 109 this voltage is coupled through the resistor 156 and the capacitor 158 to the junction 157 where it reverses biases the base and emitter electrodes of the transistor 162 to turn this transistor off. At this time the diode 174 clamps the junction 169 to ground. The voltage at the junction 169 goes negative, from approximately the voltage level of the source 68 when the transistor 162 was conducting, to the ground voltage level when the transistor 162 is cut off. The voltage at the junction 169 remains at ground voltage level as long as the transistor 162 is cut off. In other words, the transistor 162 inverts the voltage at the diodes 108 and 110. The negative-going voltage coupled through the capacitor 154 does not affect the conductivity of the transistor 130 since this PNP transistor is turned on at this time. However, this voltage charges the capacitor 154 negative in polarity at the junction 169.

The output pulse width at the junction 169 essentially depends on the time constant of the capacitor 102 and the resistor 88 as explained above. The trailing edge of the output pulse at the junction 169 causes the flip-flop 18 to switch. When the capacitor 102 charges through the resistor 88 to a potential such that the transistor 92 is cut off, the junction 75 is clamped to ground by the diode 80. Thus, the diode 110 is forward biased and conducts decreasing the voltage level at the junction 109 to turn on the transistor 162. The junction 169 immediately returns to its previous positive voltage level when the transistor 162 is turned on. This positive-going voltage at the end of the output pulse is differentiated by the capacitor 154 which is discharged, reverse biasing the base and emitter electrodes of the transistor 130 to turn it off. The voltage level at the junction 129 now decreases, causing the diode 134 to clamp it to ground and thereby turning on the transistor 120.

During the next cycle of the multivibrator 12 an output pulse is generated at the junction 191. Once the transistor 120 in the flip-flop 18 is turned on, the junction 145, and thus, the cathode of the diode 114, is at a voltage level substantially equal to that of the source 68. When the transistor 92 begins to conduct, the junction 75 and the cathode of the diode 112 are also at a positive voltage level. A positive voltage appears at the junction 113. This voltage is passed through the parallel combination of a resistor 176 and a capacitor 178 to the base 184 of an inverter transistor 182, the junction 177 of resistor 176 and base 184 being connected to source 68 through a resistor 180. In transistor 182, the emitter 186 is connected to source 68, the base 184 is connected to emitter 186 through the anode to cathode path of a diode 188 and the collector 190 is connected to negative source 72 through a resistor 192, the junction 191 of collector 190 and resistor 192 being grounded through the cathode to anode path of a diode 194, diode 194 serving to negatively clamp junction 191 to ground potential. Thus, when the positive voltage appears at the junction 113 this voltage is coupled through the resistor 176 and the capacitor 178 to the junction 177 where it reverse biases the base and emitter electrodes of the transistor 182 to turn this transistor off. A this time the diode 194 clamps the junction 191 to ground. The voltage at the junction 191 goes negative, from approximately the voltage level of the source 68 when the transistor 182 was conducting, to the ground voltage level when the transistor 182 is cut off. The voltage at the junction 191 remains at the ground voltage level as long as the transistor 182 is cut off. In other words, the transistor 182 inverts the voltage at the diodes 112 and 114. The negative-going voltage coupled through the capacitor 152 does not affect the conductivity of the transistor 120 since this PNP transistor is turned on at this time. However, this voltage charges the capacitor 152 negative in polarity at the junction 191.

When the transistor 92 is cut off, the output pulse at the junction 191 terminates. The trailing edge of this pulse resets the flip-flop 18. The junction 75 is clamped to ground by the diode 80 when the transistor 92 is cut off, thereby forward biasing the diode 112 to cause it to conduct. The voltage level at the junction 113 decreases to turn on the transistor 182. The junction 191 immediately returns to its previous positive voltage level. This positive-going voltage at the end of the output pulse is differentiated by the capacitor 152 which is discharged, reverse biasing the base and emitter electrodes of the transistor 120 to turn it off. The voltage level at the junction 145 now decreases so that the diode 148 clamps it to ground to turn on the transistor 130. This completes the cycle of the bistable circuit 18.

It is therefore appreciated that with the pulse generating arrangement of this invention, there are produced two like pulse trains 180° displaced in phase with respect to each other.

While there have been shown particular embodiments of this invention, it will, of course, be understood that it is not wished to be limited thereto since different modifications may be made both in the circuit arrangements and in the instrumentalities employed, and it is contemplated in the appended claims to cover any such modifications as fall within the true spirit and scope of the invention.

What I claim as new and desire to secure by Letters Patent of the United States is:

1. Pulse generating apparatus comprising: input means for providing sequential input pulses at a predetermined frequency, the input pulses have a selected width, bistable circuit means having input and output terminals and providing output signals at the output terminals to indicate the conductivity state of said bistable circuit means, first and second gating means, each of said gating means having input and output terminals, first connecting means for connecting said input means and the output terminals of said bistable circuit means to the input terminals of said first and second gating means, second connecting means for connecting the output terminals of said gating means to the input terminals of said bistable circuit means, means included in each of said first and second gating means responsive to the input pulses provided by said input means and to the output signals of said bistable circuit means for causing said first and second gating means to generate at their output terminals a pair of pulse trains which are 180° out of phase with each other, the frequency of each pulse train being half that of the input pulses and the width of the pulses of each pulse train being substantially the same as the width of the input pulses, and means included in said bistable circuit means responsive to the pulse trains generated by said first and second gating means for causing said bistable circuit means to change its conductivity state at the end of each input pulse provided by said input means.

2. Pulse generating apparatus comprising: input means for providing sequential input pulses at a predermined frequency, the input pulses having a selected width, bistable circuit means having input and output terminals and providing output signals at the output terminals to indicate the conductivity state of said bistable circuit means, first and second gating means, each of said gating means having input and output terminals, first connecting means for connecting said input means and the output terminals of said bistable circuit means to the input terminals of said first and second gating means, second connecting means for connecting the output terminals of said gating means to the input terminals of said bistable circuit means, means included in each of said first and second gating means responsive to the input pulses provided by said input means and to the output signals of said bistable circuit means for causing said first and second gating means to generate at their output terminals a pair of pulse trains which are 180° out of phase with each other, the frequency of each pulse train being half that of the input pulses and the width of the pulses of each pulse train being substantially the same as the width of the input pulses, and means included in said bistable circuit means responsive to the pulse trains generated by said first and second gating means for permitting said bistable circuit means to change its conductivity state only once for each separate input pulse provided by said input means.

3. The apparatus of claim 2 in which said last named means comprises a differentiating means.

4. Pulse generating apparatus comprising: input means for providing sequential input pulses at a predetermined frequency, the input pulses having a selected width, bistable circuit means having input and output terminals and providing output signals at the output terminals to indicate the conductivity state of said bistable circuit means, first and second gating means, each of said gating means having input and output terminals, first connecting means for connecting said input means and the output terminals of said bistable circuit means to the input terminals of said first and second gating means, second connecting means for connecting the output terminals of said gating means to the input terminals of said bistable circuit means, means included in each of said first and second gating means responsive to the input pulses provided by said input means and to the output signals of said bistable circuit means for causing said first and second gating means to generate at their output terminals a pair of pulse trains which are 180° out of phase with each other, the frequency of each pulse train being half that of the input pulses and the width of the pulses of each pulse train being substantially the same as the width of the input pulses, and means included in said bistable circuit means responsive to the pulse trains generated by said first and second gating means for permitting said bistable circuit means to change its conductivity state at the end of each input pulse provided by said input means and only once for each separate input pulse provided by said input means.

5. The apparatus of claim 4 in which said last named means comprises a differentiating circuit.

6. Pulse generating apparatus comprising: input means for providing sequential input pulses at a predetermined frequency, the input pulses having a selected width, bistable circuit means having a pair of input terminals and a pair of output terminals and providing output signals at the pair of output terminals to indicate the conductivity state of said bistable circuit means, first and second gating means, each of said gating means having input and output terminals, first connecting means for connecting said input means and a separate one of the output terminals of said bistable circuit means to the input terminals of each of said gating means, second connecting means for connecting the output terminals of each of said gating means to a separate one of the input terminals of said bistable circuit means, means included in each of said first and second gating means responsive to the input pulses provided by said input means and to the output signals of said bistable circuit means for causing said first and second gating means to generate at their output terminals a pair of pulse trains which are 180° out of phase with each other, the frequency of each pulse train being half that of the input pulses and the width of the pulses of each pulse train being substantially the same as the width of the input pulses, and capacitive coupling means included in said bistable circuit means and connected to each of the input terminals of said bistable circuit means for causing said bistable circuit means to change its conductivity state at the end of each input pulse provided by said input means.

References Cited by the Examiner

UNITED STATES PATENTS

| | | | |
|---|---|---|---|
| 3,047,737 | 7/1962 | Kolodin | 307—88.5 |
| 3,096,483 | 7/1963 | Ransom | 331—51 X |
| 3,231,812 | 1/1966 | Paley | 307—88.5 |

OTHER REFERENCES

De Sautels; "The Versatile Transistor NOR Circuit," Control Engineering, May 1960, pages 101–104, TJ 212.C6.

ROY LAKE, *Primary Examiner.*

S. H. GRIMM *Assistant Examiner.*